(12) United States Patent
Stamires et al.

(10) Patent No.: US 8,552,233 B2
(45) Date of Patent: *Oct. 8, 2013

(54) PRETREATMENT OF BIOMASS WITH CARBONACEOUS MATERIAL

(75) Inventors: Dennis Stamires, Dana Point, CA (US); Paul O'Connor, Hoevelaken (NL)

(73) Assignee: KiOR Inc., Pasadena, TX (US)

( * ) Notice: Subject to any disclaimer, the term of this patent is extended or adjusted under 35 U.S.C. 154(b) by 28 days.

This patent is subject to a terminal disclaimer.

(21) Appl. No.: 13/140,053

(22) PCT Filed: Dec. 16, 2009

(86) PCT No.: PCT/US2009/006567
§ 371 (c)(1),
(2), (4) Date: Jul. 13, 2011

(87) PCT Pub. No.: WO2010/071677
PCT Pub. Date: Jun. 24, 2010

(65) Prior Publication Data
US 2011/0258913 A1    Oct. 27, 2011

Related U.S. Application Data

(60) Provisional application No. 61/122,744, filed on Dec. 16, 2008.

(51) Int. Cl.
*C07C 1/00* (2006.01)

(52) U.S. Cl.
USPC ................ 585/14; 585/240; 585/242; 44/605

(58) Field of Classification Search
CPC .................................. C07C 5/00; C07C 1/00
USPC ................................ 585/240, 242, 14; 44/605
See application file for complete search history.

(56) References Cited

U.S. PATENT DOCUMENTS

| 4,529,407 | A * | 7/1985 | Johnston et al. ................ 44/553 |
| 5,752,993 | A * | 5/1998 | Eatough et al. ................. 44/553 |
| 7,811,339 | B2 * | 10/2010 | Werner ........................... 44/589 |
| 7,901,568 | B2 * | 3/2011 | O'Connor et al. ............ 208/411 |
| 7,931,784 | B2 * | 4/2011 | Medoff ..................... 204/157.63 |
| 8,168,840 | B2 * | 5/2012 | Brady et al. .................. 585/242 |
| 8,236,173 | B2 * | 8/2012 | Bartek et al. ................. 208/400 |
| 8,344,194 | B2 * | 1/2013 | Bartek et al. ................. 585/240 |
| 2008/0006520 | A1 | 1/2008 | Badger et al. |
| 2008/0016769 | A1 | 1/2008 | Pearson |
| 2008/0093209 | A1 | 4/2008 | Noto |

FOREIGN PATENT DOCUMENTS

| WO | 2008006904 A1 | 1/2008 |
| WO | 2008020046 A2 | 2/2008 |
| WO | 2008073186 A2 | 6/2008 |

OTHER PUBLICATIONS

International Search Report and Written Opinion for PCT/US09/06567, dated Mar. 25, 2010, 7 pages.

* cited by examiner

*Primary Examiner* — Nina Bhat
(74) *Attorney, Agent, or Firm* — Hovey Williams LLP

(57) ABSTRACT

A composition of matter is described herein that can be subjected to pyrolysis and converted into a bio-oil. The composition comprises an intimate mixture of a particulate solid biomass material and a carbonaceous material. The carbonaceous material acts as a reducing agent during the pyrolysis reaction. The composition of matter produces bio-oil in a greater yield than prior art processes. The bio-oil is of improved quality, as evidenced by its low TAN value.

17 Claims, No Drawings

PRETREATMENT OF BIOMASS WITH CARBONACEOUS MATERIAL

This application claims benefit under 35 USC 371 national stage entry of PCT/US09/06567, filed Dec. 16, 2009.

BACKGROUND OF THE INVENTION

1. Field of the Invention

The invention relates generally to the conversion of solid biomass to bio-oil, and more particularly to the conversion of lingo-cellulosic biomass.

2. Description of the Related Art

Processes have been proposed for the conversion of biomass to liquid products, generally referred to as bio-oil. Bio-oils are notorious for having a poor stability, due to their high oxygen content. In addition, bio-oils tend to be characterized by a low pH and a high Total Acid Number ("TAN").

It has been proposed to reduce the oxygen content of bio-oils by subjecting them to (catalytic) hydrotreatment. Because of the consumption of expensive hydrogen associated with hydrotreatment processes, such processes are too expensive to be economically viable. Moreover, part of the bio-oil is converted to coke during the hydrotreatment process, due also to the inherent instability of the bio-oil.

To reduce the coke formation during hydrotreatment it has been proposed to subject the bio-oil to a hydrogen treatment at relatively mild temperatures. Although this measure reportedly reduces the loss of bio-oil to coke formation, it also further increases the consumption of hydrogen.

Thus, there is a particular need for a biomass conversion process in which a bio-oil is produced having a reduced oxygen content. There is also a need for such a process in which the use of expensive reactants, such as hydrogen, is minimized or avoided entirely.

BRIEF SUMMARY OF THE INVENTION

The present invention addresses these problems by providing a composition of matter comprising an intimate mixture of a particulate solid biomass material and a carbonaceous material.

Another aspect of the invention comprises a method for preparing an intimate mixture of a particulate solid biomass material and a carbonaceous material comprising the step of mechanically treating the solid biomass material in the presence of the carbonaceous material.

DESCRIPTION OF ILLUSTRATIVE EMBODIMENTS

The following is a description of certain embodiments of the invention, given by way of example only.

An important aspect of the invention is providing an intimate mixture of a particulate solid biomass material and a carbonaceous material.

The term "carbonaceous material" as used herein refers to a material containing carbon and having reducing properties with respect to oxygen-containing solid biomass material. In other words, the carbonaceous material acts as a reductant or reducing agent of the solid biomass material. Likewise, the carbonaceous material acts as a reductant or reducing agent of bio-oil that is the immediate product of biomass pyrolysis.

The carbonaceous material may be a solid, a liquid, or a gas. Examples of suitable solid carbonaceous materials include coal; tar sand; bitumen; rubber; coke; char; municipal solid waste ("MSW"); plastics and other polymers, such as nylon, PVC, PET, and the like; solid hydrocarbons, such as waxes and paraffins.

Examples of suitable liquid carbonaceous materials include liquid hydrocarbons; recycle streams from biomass conversion processes, and the like.

Examples of suitable gaseous carbonaceous materials include carbon monoxide; gaseous hydrocarbons, such as methane; and the like.

With the exception of carbon monoxide, the carbonaceous material preferably has an oxygen content of less than 20 wt %, more preferably less than 10 wt %. Carbon monoxide is a unique material in that it is a strong reductant in spite of its oxygen content of more than 57 wt %.

Preferred are carbonaceous materials that are by-products or waste products of the biomass conversion process itself or of other industrial processes. If by-products or waste products are used, the cost advantages offered by the present invention are further increased. Suitable examples of such by-products and waste products include coke, char, and tar; MSW, pre-consumer and post-consumer polymer waste, gaseous hydrocarbons from oil refineries, biomass conversion processes and fermentation plants, rubber, and the like.

Rubber is, for several reasons, an attractive carbonaceous material for use in the process of the present invention. It is abundantly available at low cost in the form of used tires. Techniques are available to separate the rubber in used tires from steel cords that may be present in the tires. Any nylon cords present in the tires may be ground up together with the rubber, as nylon is a suitable carbonaceous material in its own right. Being, basically, a polyolefin, rubber has a very attractive carbon/hydrogen ratio for its use as a carbonaceous material. Moreover, rubber itself converts to useful oil under the reaction conditions of biomass pyrolysis, making it possible to mix rubber and biomass in any desired ratio.

It should be recognized, however, that rubber contains significant amounts of sulfur, due to the vulcanization that is an intrinsic part of the manufacturing process of rubber. Sulfur is generally undesirable in liquid fuels and precursors to liquid fuels, as it tends to poison the catalysts used in refining processes, and forms toxic SOx compounds during the combustion of liquid fuel in internal combustion engines.

If rubber is used as the carbonaceous material in the process of the present invention, a subsequent desulfurization treatment will generally be required to remove sulfur introduced with the rubber. Any desulfurization treatment known in the art may be used for this purpose. Particularly suitable is hydrotreatment in the presence of a desulfurization catalyst, such as a cobalt/molybdenum catalyst. Hydrotreatment has the added benefit of further reducing the oxygen content of the pyrolysis oil.

Particularly preferred as the carbonaceous material is coke, as it is abundantly produced in biomass pyrolysis processes and in oil refineries. The industry generally distinguishes between "soft coke" and "hard coke". The latter, hard coke, is deposited on heat carrier particles and/or catalyst particles in fluid cracking or fluid bed pyrolysis processes. Hard coke is characterized by a low hydrogen content, and is generally removed from the heat carrier particles or catalyst particles by combustion in the regenerator. Hard coke is difficult to separate from the particles on which it is deposited. It is possible, however, to form an intimate mixture of the solid biomass material and hard coke by mixing the solid biomass material with heat carrier particles or catalyst particles that have coke deposited thereon.

Soft coke is carbonaceous residue that is recovered from the stripper of an FCC unit or a catalytic biomass pyrolysis unit. It is more volatile than hard coke (hence the possibility of removal in a stripper), and has a higher hydrogen content than hard coke. For example, in a typical oil refinery process the hard coke generally has a hydrogen content in the range of from 4 to 6 wt %. The soft coke typically has a hydrogen content in the range of 10 to 13 wt %. It will be understood that processes using different feedstocks and/or conversion rates produce coke residues that may have compositions outside of these ranges.

Because of its abundant availability, its ease of separation from the catalyst particles, and its hydrogen content, soft coke is a particularly preferred carbonaceous material for use in the present invention.

Another important aspect of the present invention is that an intimate mixture of the particulate solid biomass and the carbonaceous material is formed, prior to the biomass conversion process. It is believed that a chemical interaction of the carbonaceous material and the solid biomass material takes place even if the two components are mixed at mild temperatures in the range of from 15° C. to 300° C.

It is also believed to be important that the carbonaceous material be present in situ as liquid products are formed during the conversion of the biomass material. Due to the presence of the carbonaceous material the bio-oil components are reduced as they are formed, so they are chemically stabilized before undesirable secondary reactions take place.

An important aspect of the present invention is a composition of matter comprising an intimate mixture of a particulate solid biomass material and a carbonaceous material. Preferably, the composition of matter consists essentially of the intimate mixture of a particulate solid biomass material and a carbonaceous material. It will be understood that, depending on its origin, the carbonaceous material may contain contaminants that do not themselves meet the definition of "carbonaceous material" as this term is used herein. The biomass material may itself contain contaminants as well, such as soil, and varying amounts of water.

A preferred method for preparing the intimate mixture of a particulate solid biomass material and a carbonaceous material comprises the step of mechanically treating the solid biomass material in the presence of the carbonaceous material.

Examples of suitable mechanical treatment processes include milling, grinding, kneading, comminuting, and combinations thereof.

Forming the intimate mixture of the biomass material and the carbonaceous material may be effected at ambient temperature, or at an elevated temperature. If an elevated temperature is used, it is generally desirable to conduct the mixing in an atmosphere of an inert or a reducing gas, in particular if the mixing temperature is above 100° C. Suitable examples of inert gases include nitrogen and steam. Suitable examples of reducing gases include hydrogen, gaseous hydrocarbons such as methane and ethane, and carbon monoxide.

It is desirable to subject the biomass material to a pretreatment so as to facilitate the mixing with the carbonaceous material. Such pretreatment may comprise drying; particle size reduction, such as chipping, milling, or grinding; disruption of the structure of the biomass material, such as defibrillation, steam explosion, and the like.

In a preferred embodiment of the method a catalyst is added to the solid biomass material prior to or during the mechanical treatment. As described hereinabove, the catalyst may be added in the form of catalyst particles having deposited thereon (hard) coke. It is also possible to add the catalyst and the carbonaceous material as separate streams.

The catalyst may be solid, or may be liquid. Examples of suitable solid catalyst materials include solid acids, such as zeolites; and solid bases. Preferred for use herein are solid bases. Examples of suitable solid bases include hydrotalcite ("HTC") and hydrotalcite like materials; layered metal hydroxides; alumina; metal oxides, such as MgO, CaO, FeO, and the like; clays; and like materials.

Examples of suitable liquid catalysts include aqueous solutions of metal oxides, metal hydroxides, and metal salts, in particular carbonates. Preferred metals are the alkali metals and the earth alkaline metals. Particularly preferred are sodium and potassium.

As mentioned earlier, the mechanical treatment may be carried out at ambient temperature or at an elevated temperature. As it is important to form the intimate mixture of the solid biomass material and the carbonaceous material prior to conversion of the biomass material to liquid bio-oil components, the mechanical treatment should be carried out at a temperature at which no significant quantities of liquid conversion products are formed. In general, temperatures in the range of from 30 to 300° C. are suitable.

In a specific embodiment the solid biomass is subjected during at least part of the mechanical treatment to a temperature in the range of from 90° C. to 200° C., preferably from 105° C. to 150° C. It has been found that biomass, in particular ligno-cellulosic biomass, loses an important part of its mechanical strength upon exposure to temperatures in these ranges, by a process referred to as "toasting". This reduction in mechanical strength causes the mechanical treatment to result in a significant particle size reduction of the solid biomass. It will be understood that such size reduction is beneficial to the subsequent conversion reaction.

In an alternate embodiment the solid biomass material is subjected during at least part of the mechanical treatment process to a temperature in the range of from 200° C. to 300° C. Like toasting, this process step (referred to as "roasting") results in a significantly reduced mechanical strength of the biomass material. Although some decomposition of the solid biomass takes place at temperatures in this range, the decomposition products are mostly gaseous and are not as prone to secondary reactions as liquid pyrolysis products.

Both the toasting and the roasting steps make the biomass material more hydrophobic, which facilitates the formation of the intimate mixture with the carbonaceous material, in particular if the carbonaceous material is a liquid.

In another aspect the invention relates to a process for converting particulate solid biomass to a bio-oil, said process comprising the steps of (i) forming a composition of matter comprising an intimate mixture of the solid particulate biomass material and a carbonaceous matter; and (ii) subjecting the composition of matter of step (i) to a pyrolysis reaction.

Preferably the pyrolysis reaction is carried out in the presence of at least one catalyst. As described hereinabove, a catalyst may be added to the solid biomass material during the mechanical treatment step. Alternatively, a solid particulate catalyst may be added immediately prior to or during the pyrolysis reaction.

The pyrolysis reaction may be carried out in any suitable reactor. Examples include fixed bed, fluid bed, entrained fluid bed, cyclone and ablative reactors. Preferred for use herein is a circulating fluid bed reactor, wherein the circulating bed comprises fluidizable catalyst particles. The conversion reactor equipment may further comprise a stripper, for removing reaction product from the catalyst particles, and a regenerator for regenerating the catalyst particles. As discussed hereinabove, soft coke from the stripper is particularly suitable for use as the carbonaceous material.

The pyrolysis reaction is carried out at a temperature in the range of from 350° C. to 650° C., preferably from 400 to 550° C. By definition, a pyrolysis reaction is carried out in the substantial absence of oxygen. Under the reaction conditions the carbonaceous material acts as a reducing agent. Preferred are hydrogen-containing carbonaceous materials (hydrocarbons, polymers, soft coke, char, tar, etc.) that can act as hydrogen donors during the pyrolysis reaction.

The pyrolysis of the solid biomass material produces solid reaction products (coke, char, tar); gaseous reaction products ($CO$, $CO_2$, $CH_4$, light olefins), and reaction products that are liquid at room temperature, collectively referred to as bio-oil. It will be understood that the bio-oil is in the vapor phase at the temperature of the pyrolysis reaction. Suitably the conversion equipment comprises a condensor for liquefying the bio-oil vapors.

The presence of the carbonaceous material in intimate mixture with the solid biomass material results in an increased bio-oil yield. The increase of the bio-oil yield is primarily at the expense of the coke and char yields, as much of the coke and char is formed during secondary reactions of oxygenated bio-oil components.

In addition to increasing the bio-oil yield, the presence of the carbonaceous material also improves the quality of the bio-oil that is produced. Standard biomass pyrolysis processes produce a bio-oil having a Total Acid Number ("TAN") of more than 50. The term Total Acid Number, or TAN, as used herein, is defined as the amount of KOH in mg required to neutralize 1 g of the bio-oil.

The bio-oils produced by pyrolysis of the intimate mixture of solid biomass material and carbonaceous material generally have a TAN of less than 30, preferably less than 20, more preferably less than 10, and most preferably less than 5.

Any solid biomass material is suitable for use in the present invention. Preferred are biomass materials comprising cellulose, in particular ligno-cellulosic materials.

For ethical and economic reasons it is preferred to use biomass materials that cannot themselves be used as food, and do not compete with food harvests for arable acreage. Preferred sources of biomass include aquatic plants, such as algae; energy crops such as switch grass and fast-growing trees (willow, poplar, eucalyptus); agricultural wastes (straw, corn stover; bagasse); and forestry wastes (bark, branches, saw dust, wood chips).

What is claimed is:

1. A process for converting particulate solid biomass material to a bio-oil, said process comprising the steps of (i) forming a composition of matter comprising an intimate mixture of the solid particulate biomass material and a carbonaceous material; and (ii) subjecting the composition of matter of step (i) to a pyrolysis reaction.

2. The process of claim 1 wherein the pyrolysis reaction is carried out in the presence of at least one catalyst.

3. The process of claim 1 wherein the carbonaceous material acts as a reducing agent during the pyrolysis reaction.

4. The process of claim 1 wherein the carbonaceous material acts as a hydrogen donor during the pyrolysis reaction.

5. A bio-oil produced by the process of claim 1.

6. The bio-oil of claim 5 having a total acid number (TAN) of less than 30.

7. The bio-oil of claim 5 having a total acid number (TAN) of less than 20.

8. The bio-oil of claim 5 having a total acid number (TAN) of less than 10.

9. The process of claim 1 wherein the carbonaceous material is selected from the group consisting of coal; coke; char; tar; bio-oil; municipal solid waste; synthetic polymers; rubber; hydrocarbons; carbon monoxide; and mixtures thereof.

10. The process of claim 1 wherein the carbonaceous material contains less than 10 wt % of oxygen.

11. The process of claim 1 wherein the forming of step (i) comprises mechanically treating the particulate solid biomass material in the presence of the carbonaceous material, wherein the mechanical treatment is selected from milling, grinding, kneading, comminuting, and combinations thereof.

12. The process of claim 11 wherein the solid particulate biomass material is subjected to a temperature in the range of 30° C. to 300° C. prior to and/or during the mechanical treatment.

13. The process of claim 12 wherein the temperature is in the range of from 90° C. to 200° C.

14. The process of claim 1 further comprising subjecting the solid particulate biomass material to a pretreatment prior to the forming of step (i).

15. The process of claim 2 wherein the catalyst comprises a zeolite.

16. The process of claim 1 wherein the pyrolysis reaction occurs at a temperature in the range of from 350° C. to 650° C.

17. The process of claim 1 wherein the pyrolysis reaction occurs at a temperature in the range of from 400° C. to 550° C.

* * * * *